United States Patent
Parrish et al.

(10) Patent No.: US 11,645,442 B1
(45) Date of Patent: *May 9, 2023

(54) METHOD FOR REDUCING COST AND INCREASING ACCURACY OF VARIATIONAL QUANTUM CIRCUIT OPTIMIZATION

(71) Applicant: QC Ware Corp., Palo Alto, CA (US)

(72) Inventors: Robert M. Parrish, Woodside, CA (US); Joseph T. Iosue, Mountain View, CA (US); Asier Ozaeta Rodriguez, Merced, CA (US); Peter L. McMahon, Ithaca, NY (US)

(73) Assignee: QC Ware Corp., Palo Alto, CA (US)

(*) Notice: Subject to any disclaimer, the term of this patent is extended or adjusted under 35 U.S.C. 154(b) by 85 days.

This patent is subject to a terminal disclaimer.

(21) Appl. No.: 17/238,977

(22) Filed: Apr. 23, 2021

Related U.S. Application Data

(63) Continuation of application No. 16/840,935, filed on Apr. 6, 2020, now Pat. No. 11,023,638.

(Continued)

(51) Int. Cl.
*G06F 30/30* (2020.01)
*G06F 30/337* (2020.01)
(Continued)

(52) U.S. Cl.
CPC .......... *G06F 30/337* (2020.01); *G06F 17/141* (2013.01); *G06N 10/00* (2019.01); *G06F 2111/10* (2020.01)

(58) Field of Classification Search
CPC .. G06F 30/337; G06F 17/141; G06F 2111/10; G06F 17/11; G06N 10/00
(Continued)

(56) References Cited

U.S. PATENT DOCUMENTS

| | | | |
|---|---|---|---|
| 7,364,923 B2* | 4/2008 | Lidar | G06N 10/00 257/31 |
| 10,031,791 B1* | 7/2018 | Wallman | G06N 10/00 |

(Continued)

OTHER PUBLICATIONS

Nakanishi, K.M. et al., "Sequential minimal optimization for quantum-classical hybrid algorithms," arXiv, Mar. 28, 2019, vol. 1903.121, pp. 1-11.

*Primary Examiner* — Jack Chiang
*Assistant Examiner* — Brandon Bowers
(74) *Attorney, Agent, or Firm* — Fenwick & West LLP

(57) ABSTRACT

The optimization of circuit parameters of variational quantum algorithms is a challenge for the practical deployment of near-term quantum computing algorithms. Embodiments relate to a hybrid quantum-classical optimization methods. In a first stage, analytical tomography fittings are performed for a local cluster of circuit parameters via sampling of the observable objective function at quadrature points in the circuit parameters. Optimization may be used to determine the optimal circuit parameters within the cluster, with the other circuit parameters frozen. In a second stage, different clusters of circuit parameters are then optimized in "Jacobi sweeps," leading to a monotonically convergent fixed-point procedure. In a third stage, the iterative history of the fixed-point Jacobi procedure may be used to accelerate the convergence by applying Anderson acceleration/Pulay's direct inversion of the iterative subspace (DIIS).

20 Claims, 9 Drawing Sheets

Related U.S. Application Data

(60) Provisional application No. 62/829,745, filed on Apr. 5, 2019.

(51) Int. Cl.
*G06F 17/14* (2006.01)
*G06N 10/00* (2022.01)
*G06F 111/10* (2020.01)

(58) Field of Classification Search
USPC .......................................................... 716/132
See application file for complete search history.

(56) References Cited

U.S. PATENT DOCUMENTS 10,850,978 B2 * 12/2020 Leipold ..................... G06F 1/20
2019/0347575 A1 * 11/2019 Pednault ................. G06F 30/30

* cited by examiner

METHOD FOR REDUCING COST AND INCREASING ACCURACY OF VARIATIONAL QUANTUM CIRCUIT OPTIMIZATION

CROSS-REFERENCE TO RELATED APPLICATION

This application is a continuation of U.S. patent application Ser. No. 16/840,935, filed on Apr. 6, 2020, which claims priority under 35 U.S.C. § 119(e) to U.S. Provisional Patent Application Ser. No. 62/829,745, "Method for Reducing the Cost and Increasing the Accuracy of Variation Quantum Circuit Optimization by Fixed-Point Jacobi Sweeps with Analytical Cluster Tomography and Augmented by Anderson Acceleration," filed on Apr. 5, 2019, each of which is incorporated by reference in its entirety.

BACKGROUND

1. Technical Field

This disclosure relates to variational quantum circuit optimization, and in particular it relates to a Jacobi diagonalization and Anderson acceleration method for variational quantum algorithm parameter optimization.

2. Description of Related Art

Variational quantum algorithms are a general family of methods that offer a tractable route to obtaining quantum advantage over classical computing by utilizing the entanglements of a quantum circuit to produce a high-quality approximation to the ground state wavefunction of a Hamiltonian operator which encodes a physically or industrially interesting optimization problem. A challenge with variational quantum algorithms is the hybrid quantum-classical optimization of the parameters of the entangling quantum circuit to minimize the expectation value of the Hamiltonian observable. For variational quantum algorithms, it is generally found that converging the observable expectation value to the global minimum increases (e.g., maximizes) the quality of the solution. The optimizations are, however, remarkably difficult, with many local minima, large indefinite regions of the potential surface, and vast regions of "barren plateaus" with small gradients precluding straightforward use of conventional optimization techniques.

SUMMARY

Some embodiments relate to a hybrid method for improving an observable expectation value of a quantum circuit. The quantum circuit includes N nonoverlapping groups of G one-qubit rotation gates (G may be different for each group), where the G gates within each group are characterized by a parameter $\theta_n$ and the observable expectation value is a function of the parameters $\theta_n$ for all N groups. One step improves a subset M of the N groups. The selected subset of gates is characterized by parameters $\theta_m$. A non-quantum processor determines at least $(2G+1)^M$ grid points sampling a domain of the parameters $\theta_m$. A quantum processor configures the parameters $\theta_m$ of the quantum circuit for each grid point and samples the observable expectation value of the quantum circuit configured at each grid point while holding the other parameters constant. A non-quantum processor determines a tomography function for the observable expectation value as a function of the parameters $\theta_m$. The tomography function is determined based on the sampled observable expectation values. A non-quantum processor determines values of the parameters $\theta_m$ that optimize the tomography function.

Some embodiments repeat this step to sweep through all of the parameters $\theta_n$. Each sweep includes a fixed number of iterations that sweep through all of the parameters $\theta_n$. Each iteration follows the step described above. In some embodiments, each sweep iterates through the same subsets in the same order.

Some embodiments may further improve the sweeps as follows. A non-quantum processor predicts a set of parameters $\theta_n$ that has an improved observable expectation value compared to the parameters $\theta_n$ resulting from the immediately previous sweep. The prediction is based on the parameters $\theta_n$ from previous sweeps and error values associated with the parameters $\theta_n$ from previous sweeps.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Introduction

This disclosure is in the technical field of circuit-model quantum computing. It describes a set of strategies for optimizing the parameters of variational quantum algorithms (also known as "hybrid quantum-classical algorithms"), including but not limited to the quantum approximate optimization algorithm (QAOA), the variational quantum eigensolver (VQE) algorithm, and quantum neural network (QNN) algorithms. The strategies aim to improve the performance of variational quantum algorithms, where performance may be measured in terms of time-to-solution, solution accuracy, or a mixture of both.

This disclosure describes a new hybrid quantum-classical optimization technique that merges optimization methods with domain knowledge of the nature of the functional form or "tomography" of the quantum objective function to produce a new family of optimization methods which provide higher performance for variational quantum algorithm optimization.

A problem in variation quantum algorithm deployment is the optimization of the observable expectation value $\mathcal{O}$ (a real scalar function) as a function of the quantum circuit parameters $\{\theta\}$. The quantum nature of the quantum circuit used to produce $\mathcal{O}$ implies that it is intractable to classically (e.g., analytically) determine the explicit function $\mathcal{O}(\{\theta\})$ for all possible values of $\{\theta\}$. However, it is tractable to sample $\mathcal{O}$ a finite number of times at different values of $\{\theta\}$. From such measurements, it is possible to reconstruct partial information about the general functional form of $\mathcal{O}(\{\theta\})$ (a process called "tomography"), and to use such information to perform the desired optimization of the quantum circuit parameters. To this point, gradient-based techniques such as L-BFGS (Limited-memory Broyden-Fletcher-Goldfarb-Shanno algorithm) and gradient-free techniques such as Powell's method have been applied to this problem.

Figure 1:
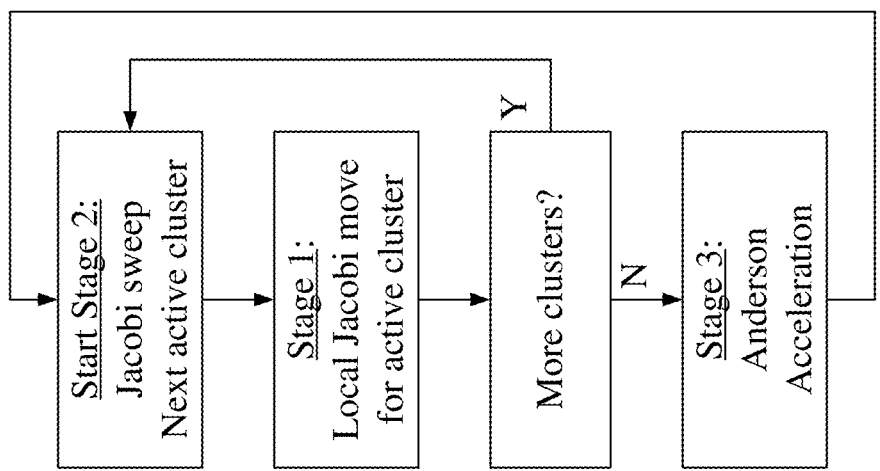
FIG. 1 is a flowchart of a method for optimizing a quantum circuit, according to an embodiment.

FIG. 1 is a flowchart of a method for optimizing a quantum circuit, according to an embodiment. In particular, FIG. 1 illustrates a method for reducing (e.g., finding the global minimum of) an observable expectation value $\mathcal{O}$ of a quantum circuit by optimizing parameters of the circuit. FIG. 1 includes three nested stages: Stage 1 (aka, Jacobi step or local Jacobi move), Stage 2 (aka, Jacobi sweep), and Stage 3 (aka, Anderson/Pulay acceleration), which are further described below. Stage 1 is described with reference to FIGS. 2 and 3. Stage 2 is described with reference to FIGS. 4-5. Stage 3 is described with reference to FIG. 6.

Stage 1 Description

Figure 2:
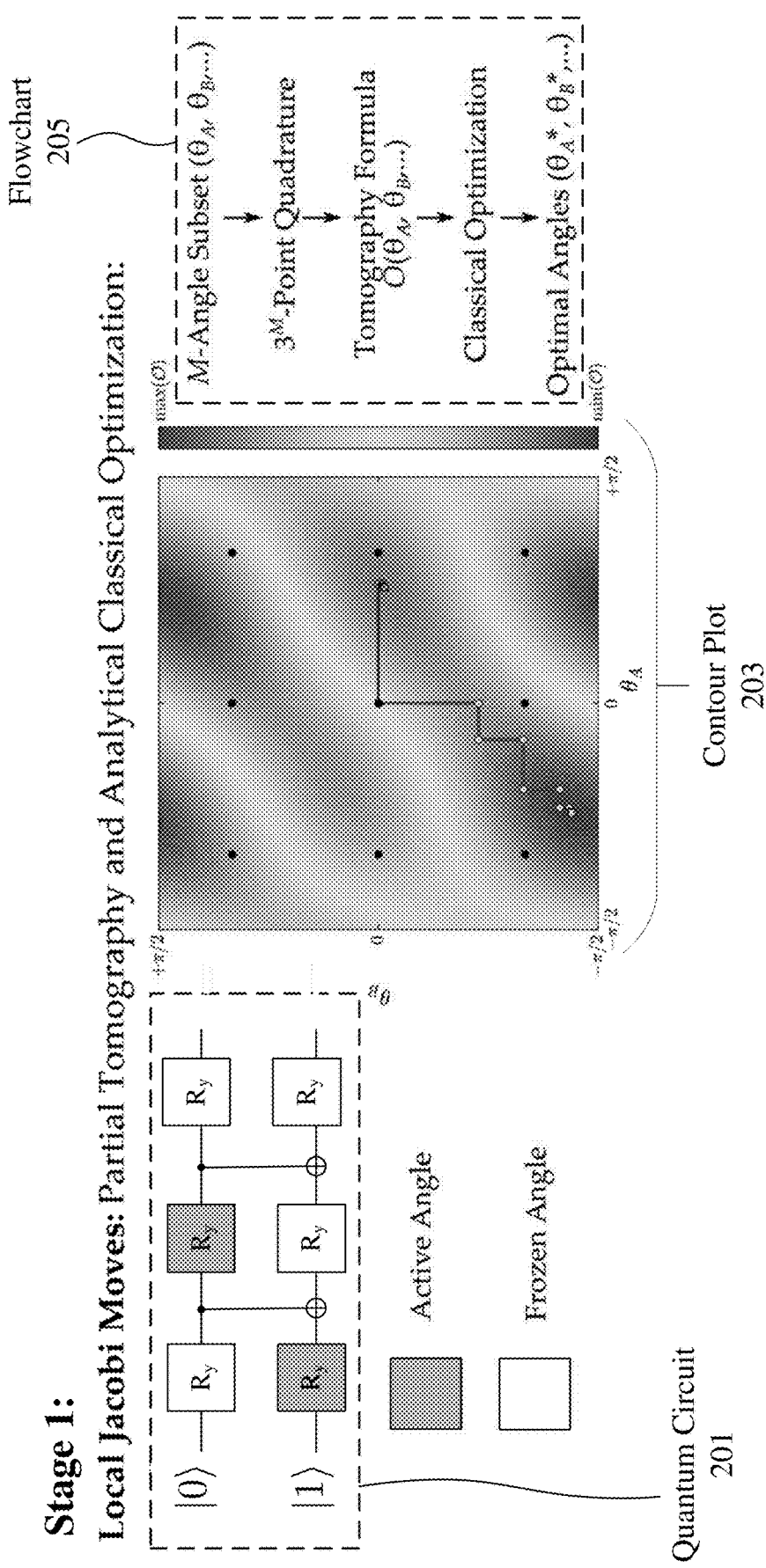
FIG. 2 illustrates an example quantum circuit diagram, a contour plot of a tomography function associated with the quantum circuit, and a flowchart of a method for obtaining a tomography function for the quantum circuit, according to an embodiment.
Figure 3:
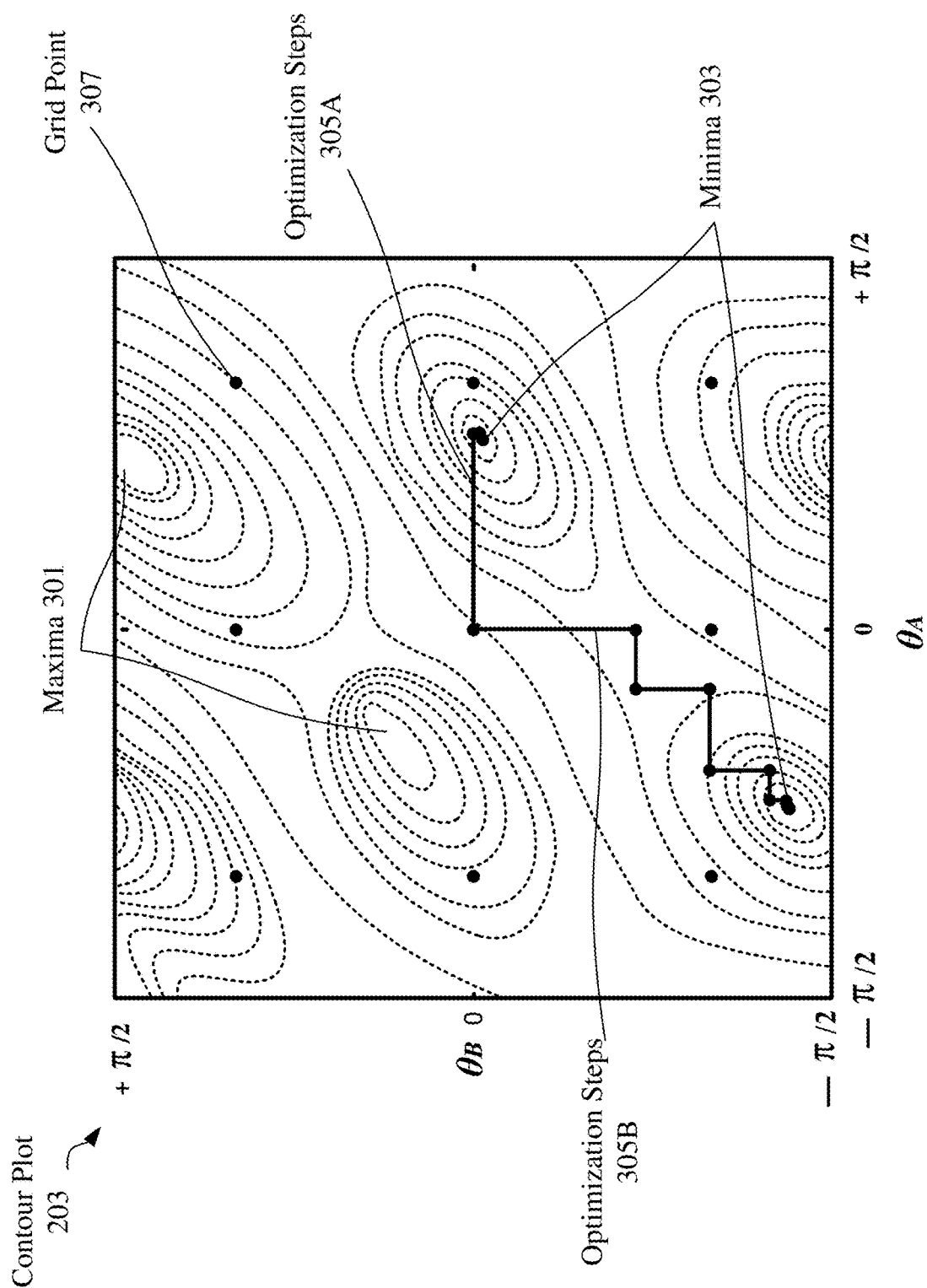
FIG. 3 is a detailed view of the contour plot in FIG. 2, according to an embodiment.

FIG. 2 illustrates a quantum circuit diagram 201, a contour plot 203 of the tomography function associated with the quantum circuit 201, and a flowchart 205 for obtaining the tomography function, according to an embodiment. FIG. 3 is a detailed view of the contour plot 203, according to an embodiment.

The circuit 201 is a quantum circuit (or a portion of a quantum circuit) with gates characterized by circuit parameters $\{\theta\}$. It may be desirable to determine the observable expectation value $\mathcal{O}(\{\theta\})$ for all possible values of $\{\theta\}$. The circuit 201 includes two qubits, six one-qubit rotational gates $R_y$ (each with a circuit parameter $\theta$), and two Controlled Not (CNOT) gates. In the example of FIG. 2, the gates $R_y$ are generalized y-axis rotation gates with the form $R_y(\theta)=e^{i\theta Y}$, where Y is the Pauli-Y gate. The gates $R_y$ are used for simplicity. Other one-qubit gates may be used, such as generalized x-axis and z-axis rotation gates. The circuit 201 is an example quantum circuit that will be referenced for example purposes throughout the rest of the disclosure. Other quantum circuits (e.g., with different gates, qubits, depth, etc.) may be solved by the methods described herein. For example, a given quantum circuit can be re-written to use entirely $R_y$ gates (e.g., via a gate transformation). In another example, the methods described herein can be adapted to use the parametrization, tomography formulae, and sampling grids unique to the native gate set of the given quantum circuit.

In Stage 1, the solution of the optimization problem is solved locally for only a handful or "cluster" of active quantum circuit parameters, while the rest of the parameters are held constant (referred to as "frozen"). For example, in FIG. 1, the top middle gate and the bottom left gate are gates with active quantum circuit parameters while the circuit parameters of the remaining gates are frozen during the Stage 1 process. In some embodiments, the analytical form of $\mathcal{O}(\{\theta\})$ within the active cluster parameters is definitionally restricted to a discrete Fourier series of definite length, with Fourier coefficients (also referred to as "tomography coefficients"). The tomography coefficients are problem- and quantum-circuit-specific. The determination of the tomography coefficients can be done exactly (e.g., in the absence of device or statistical noise channels) by evaluating $\mathcal{O}(\{\theta\})$ on a small rectilinear Fourier quadrature grid of the active cluster parameters, followed by a discrete Fourier transformation. This fully determines the analytical tomography function for $\mathcal{O}(\{\theta\})$ within the active cluster parameters. Since the maxima of some of the analytical tomography functions cannot be determined analytically (e.g., when a cluster includes more than one parameter), classical optimization techniques, such as Newton-Raphson, L-BFGS, or iterative analytical solutions in alternating directions, are then applied (e.g., offline from the quantum processor) to optimize the circuit parameters within the cluster based on the tomography function.

As previously stated, the contour plot 203 illustrates an example tomography function for circuit 201. Since all but two of the circuit parameters $\theta$ are held constant, the plot only includes two circuit parameter domains, labeled $\theta_A$ and $\theta_B$. The tomography function includes two maxima 301 and two minima 303. The optimization steps 305A and 305B illustrate iterations of a classical optimization algorithm to find minima 303 (e.g., a global minima) of the tomography function. Due to the sinusoidal nature of the tomography function, the two minima 301 may be the same value.

The contour plot 203 also includes a Fourier quadrature grid. Since, the tomography function is restricted to a discrete Fourier series of definite length, the tomography function can be determined by sampling the observable expectation value of the quantum circuit at the grid points 307. Since circuit 201 has two active circuit parameters, plot 203 includes nine grid points 307 (described further below). The grid points 307 are evenly spaced apart at values of $\theta=0$, $\pm\pi/3$, although this not required. The evenly spaced choice may provide the best mode for (e.g., rapid) statistical convergence of the tomography parameters with respect to number of quantum measurements. In other embodiments, three different values of $\theta$ may be sufficient to determine the tomography function.

Example Method Steps of Stage 1

In some embodiments, Stage 1 is a quadrature-based method to experimentally obtain the analytical tomography formula for the observable expectation value of a quantum circuit across all possible quantum circuit parameters by evaluating the observable expectation value at a small discrete set of parameters (a "quadrature"). For example, see flowchart 205. The steps of this method may include:

A subset of active circuit parameters (referred to as a "cluster") is selected. The subset maybe a proper subset of the circuit parameters. If the total number of circuit parameters being optimized is small enough (e.g., less than five) or the computational power of the system is high enough, then all of the circuit parameters may be selected. In these situations, Stages 2 and 3 may not be necessary to optimize the circuit parameters.

A Fourier quadrature grid of appropriate size and dimension is defined for the considered subset of active circuit parameters. A general cluster of M sets of circuit parameters (the sets of circuit parameters may be overlapping sets), each determining the parameter for G one-qubit (e.g., rotation) gates may use a rectilinear grid with a total of $(2G+1)^M$ Fourier grid points evenly spaced in the periodic domain of the circuit parameters (e.g., see grid points 307). Note that G represents the number of one-qubit gates in each of the M sets that are pinned together (e.g., have the same circuit parameter).

The analytical tomography function (also referred to as formula) is defined for the observable expectation value of the quantum circuit as a function of (any possible) combinations of parameters within the active cluster. In general, the tomography function is the rectilinear M-dimensional discrete Fourier series, with 2G+1 Fourier basis functions (complex roots of unity) in each dimension. The linear coefficients of the Fourier series are the quantum-circuit-specific "tomography coefficients."

The observable expectation value $\mathcal{O}$ of the quantum circuit is sampled at each Fourier quadrature grid point. The frozen parameters may have predefined values (e.g., $\theta_i=0$ at the beginning of an optimization, or prior determined values during optimization).

A discrete Fourier transformation is performed on the set of observable expectation values $\mathcal{O}$ sampled at the Fourier quadrature grid points to obtain the tomography coefficients and complete the determination of the analytical tomography formula for the active cluster of circuit parameters.

Locally optimized circuit parameters for the cluster are analytically determined based on the determined tomography function. Optimized circuit parameters may result in the tomography function for the active cluster being at a minimum value within a threshold error.

Example Cases of Stage 1

A 3-point Fourier quadrature grid may be determined for an M=1, G=1 cluster using a single one-qubit gate (as often encountered in VQE). The analytical tomography formula for this single one-qubit gate is: $O(\theta)=\alpha+\beta \cos(2\theta)+\gamma \sin(2\theta)$, where $\alpha$, $\beta$, and $\gamma$ are the tomography coefficients. By determining the tomography coefficients using the 3-point quadrature grid, the tomography function may be determined.

A 9-point Fourier quadrature grid may be determined for an M=2, G=1 cluster using a pair of one-qubit gates (as often encountered in VQE).

A $3^M$-point Fourier quadrature grid may be determined for an M=M, G=1 cluster using M one-qubit gates (as often encountered in VQE). Thus, this grid resolves the analytical tomography formula for a cluster of M one-qubit gates.

A $(2G+1)^M$-point Fourier quadrature may be determined for an M=M, G=G cluster using M groups of G one-qubit gates (as often encountered in QAOA). Thus, this grid resolves the analytical tomography formula for a cluster of M groups of G one-qubit gates.

Example Tomography Functions

1. One-Gate Tomography

Figure 7A:
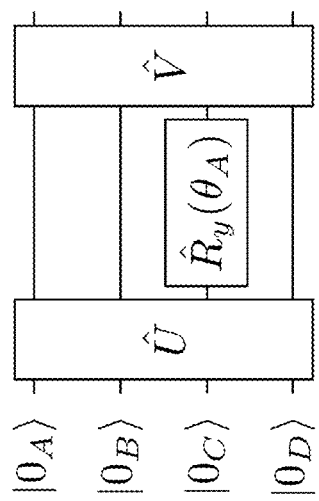
FIGS. 7A-7D are generalized quantum circuit diagrams, according to some embodiments.

Consider a general $R_y$ gate quantum circuit of the form seen in FIG. 7A (e.g., as encountered in VQE). The corresponding observable expectation value is, $$\mathcal{O}(\theta_A) = \langle 0 | \hat{U}^\dagger \hat{R}_y^\dagger(\theta_A) \hat{V}^\dagger \hat{O} \hat{V} \hat{R}_y(\theta_A) \hat{U} | 0 \rangle \qquad (1)$$

Here $\hat{O}$ is a Hermitian operator, and $\hat{U}$ and $\hat{V}$ are unitary operators, all in the $2^N$-dimensional Hilbert space for N qubits. These matrices are problem-specific, and their construction may be determined before the invocation of the quantum algorithm. $\hat{R}_y(\theta_A) \equiv e^{-i\theta_A \hat{Y}_A}$ is a one-qubit rotation gate acting on an arbitrary qubit corresponding to index A. The observable expectation value $\mathcal{O}(\theta_A)$ is periodic for $$\theta_A \in \left[-\frac{\pi}{2}, +\pi/2\right).$$

By inspection, this has the definitional tomography, $$\mathcal{O}(\theta_A) = \alpha + \beta \cos(2\theta_A) + \gamma \sin(2\theta_A) \qquad (2)$$

Here, $\{\alpha, \beta, \gamma\}$ are the "tomography parameters," whose values depend on the specifics of the problem (e.g., the operators $\hat{U}$, $\hat{V}$, and $\hat{O}$).

To determine the tomography parameters, we can define the three-point Fourier quadrature, $$\mathcal{O}^- \equiv \mathcal{O}(-\pi/3), \mathcal{O}^0 \equiv \mathcal{O}(0), \mathcal{O}^+ \equiv \mathcal{O}(+\pi/3) \qquad (3)$$

This has the matrix form, $$\underbrace{\begin{bmatrix} 1 & -1/2 & \sqrt{3}/2 \\ 1 & 1 & 0 \\ 1 & 1/2 & \sqrt{3}/2 \end{bmatrix}}_{\hat{T}_{(1)}} \begin{bmatrix} \alpha \\ \beta \\ \gamma \end{bmatrix} = \begin{bmatrix} \mathcal{O}^- \\ \mathcal{O}^0 \\ \mathcal{O}^+ \end{bmatrix} \qquad (4)$$

The inverse is $$\hat{T}_{(1)}^{-1} = \frac{1}{3}\begin{bmatrix} 1 & 1 & 1 \\ -1 & 2 & -1 \\ -\sqrt{3} & 0 & \sqrt{3} \end{bmatrix} \qquad (5)$$

2. Two-Gate Tomography

Figure 7B:
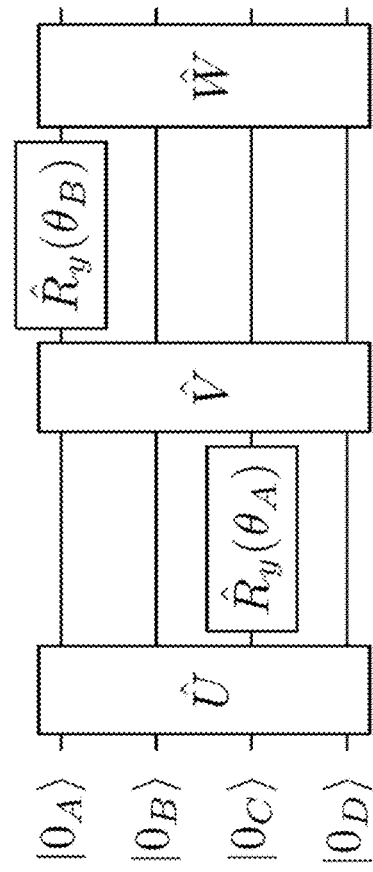

Now consider a general two $R_y$ gate quantum circuit of the form seen in FIG. 7B (e.g., as encountered in VQE). The corresponding observable expectation value is, $$\mathcal{O}(\theta_A, \theta_B) = \langle 0 | \hat{U}^\dagger \hat{R}_y^\dagger(\theta_A) \hat{V}^\dagger \hat{R}_y^\dagger(\theta_B) \hat{W}^\dagger \times \hat{O} \hat{W} \hat{R}_y(\theta_B) \hat{V} \hat{R}$$
$$(\theta_A) \hat{U} | 0 \rangle \qquad (6)$$

By inspection, this has the tomography $$\mathcal{O}(\theta_A, \theta_B) = \alpha\alpha + \alpha\beta \cos(2\theta_B) + \alpha\gamma \sin(2\theta_B) + \beta\alpha \cos$$
$$(2\theta_A) + \beta\beta \cos(2\theta_A)\cos(2\theta_B) + \beta\gamma \cos(2\theta_A)\sin$$
$$(2\theta_B) + \gamma\alpha \sin(2\theta_A) + \gamma\beta \sin(2\theta_A)\cos(2\theta_B) + \gamma\gamma \sin$$
$$(2\theta_A)\sin(2\theta_B) \qquad (7)$$

We can define a nine-point Fourier quadrature, $$\mathcal{O}^{--} \equiv \mathcal{O}(-\pi/3, -\pi/3), \mathcal{O}^{-1} \equiv \mathcal{O}(-\pi/3, 0),$$

$$\mathcal{O}^{-+} \equiv \mathcal{O}(-\pi/3, +\pi/3), \mathcal{O}^{0-} \equiv \mathcal{O}(0, -\pi/3),$$

$$\mathcal{O}^{00} \equiv \mathcal{O}(0,0), \mathcal{O}^{0+} \equiv \mathcal{O}(0, +\pi/3)$$

$$\mathcal{O}^{+-} \equiv \mathcal{O}(+\pi/3, -\pi/3), \mathcal{O}^{+0} \equiv \mathcal{O}(+\pi/3, 0)$$

$$\mathcal{O}^{++} \equiv \mathcal{O}(+\pi/3, +\pi/3) \qquad (8)$$

This has the matrix form, $$\hat{T}_{(2)} \begin{bmatrix} \alpha\alpha \\ \alpha\beta \\ \alpha\gamma \\ \beta\alpha \\ \beta\beta \\ \beta\gamma \\ \gamma\alpha \\ \gamma\beta \\ \gamma\gamma \end{bmatrix} = \begin{bmatrix} O^{--} \\ O^{-0} \\ O^{-+} \\ O^{0-} \\ O^{00} \\ O^{0+} \\ O^{+-} \\ O^{+0} \\ O^{++} \end{bmatrix} \quad (9)$$

Here $\hat{T}_{(2)} \equiv \hat{T}_{(1)} \otimes \hat{T}_{(1)}$ and the corresponding inverse is, $\hat{T}_{(2)}^{-1} = \hat{T}_{(1)}^{-1} \otimes \hat{T}_{(1)}^{-1}$.

3. M-Gate Tomography

Figure 7C:
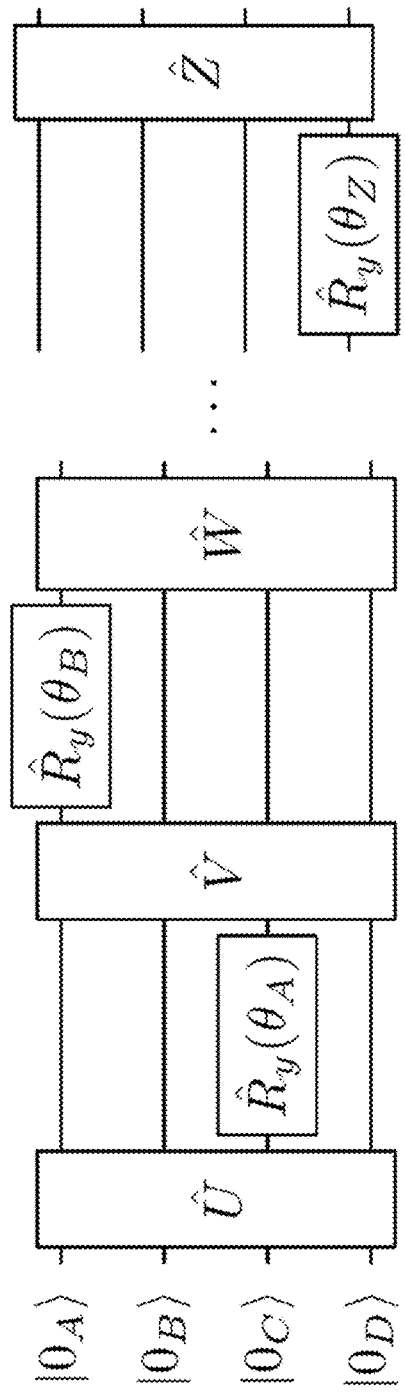

Now consider a general M Ry gate quantum circuit of the form seen in FIG. 7C (e.g., as encountered in VQE). The corresponding observable expectation value is, $$\mathcal{O}(\theta_A, \theta_B, \ldots, \theta_Z) = \langle 0|\hat{U}^\dagger \hat{R}_y^\dagger(\theta_A)\hat{V}^\dagger \hat{R}_y^\dagger(\theta_B)\hat{W}^\dagger \ldots \hat{R}_y^\dagger(\theta_Z)\hat{Z}^\dagger \times \hat{O}\hat{Z}\hat{R}_y(\theta_Z) \ldots \hat{W}\hat{R}_y(\theta_B)\hat{V}\hat{R}_y(\theta_A)\hat{U}|0\rangle \quad (10)$$

Note that the alphabetical labeling $\theta_A, \theta_B, \ldots, \theta_Z$ is merely illustrative—there can be more or less than 26 gates depending on M. This has the $3^M$-parameter tomography, $$O(\theta_A, \theta_B, \ldots, \theta_Z) = \sum_{\vec{i}} C_{\vec{i}} \prod_{i_D \in \vec{i}} \phi_{i_D}(\theta_D) \quad (11)$$

where $\vec{i}$ ranges over the set of trinary strings of length M, e.g., 000, 001, 002, 010, 011, 012, 020, 021, 022, 100, etc., and the basis functions are $\varnothing_0(\theta) \equiv 1$, $\varnothing_1(\theta) \equiv \cos(2\theta)$, and $\varnothing_2(\theta) \equiv \sin(2\theta)$.

The tomography coefficients $\{c_{\vec{i}}\}$ can be computed from a $3^M$-point quadrature grid consisting of a Cartesian grid of $\{-\pi, 3, 0+\pi/3\}$ in each angle. The transfer matrix is $\hat{T}_{(M)} \equiv \otimes_M \hat{T}_{(1)}$, and the corresponding inverse is $\hat{T}_{(M)}^{-1} = \otimes_M \hat{T}_{(1)}^{-1}$.

4. QAOA Tomography

Figure 7D:
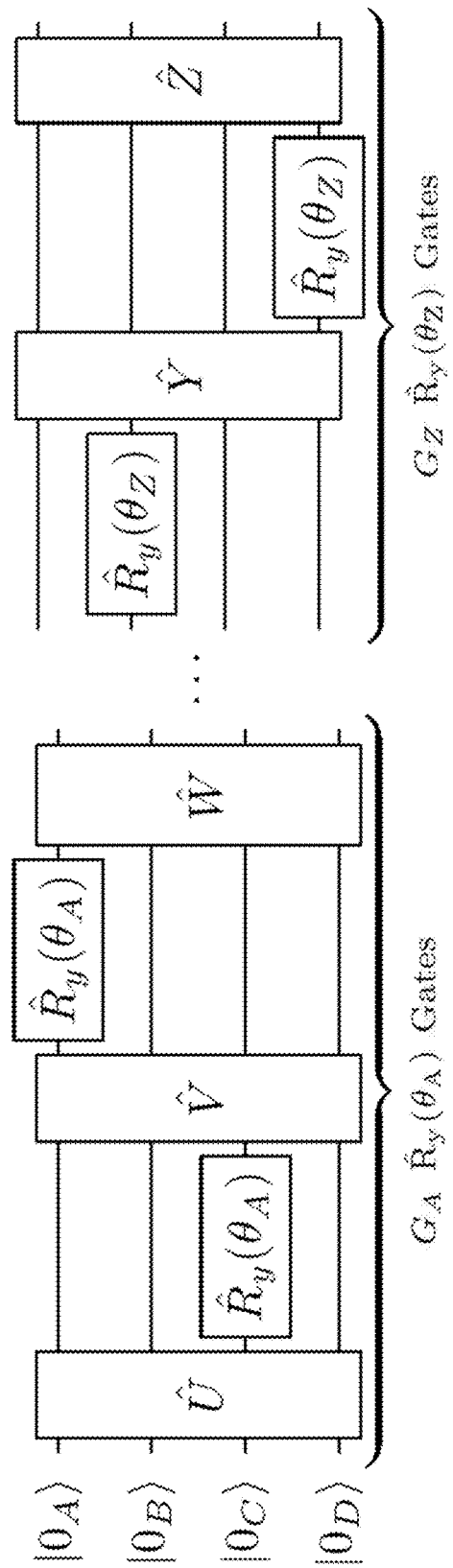

In QAOA, we often encounter a generalization or simplification where the parameters of multiple $R_y$ gates are pinned together, e.g., an M-stage quantum circuit where each stage D has $G_D$ $\hat{R}_y(\theta_D)$ gates as seen in FIG. 7D. The corresponding observable expectation value is, $$\mathcal{O}(\theta_A, \ldots, \theta_Z) = \langle 0|\hat{U}^\dagger \hat{R}_y^\dagger(\theta_A)\hat{V}^\dagger \hat{R}_y^\dagger(\theta_A)\hat{W}^\dagger \ldots \hat{R}_y^\dagger(\theta_Z)\hat{V}^\dagger \hat{R}_y^\dagger(\theta_Z)\hat{Z}^\dagger \times \hat{O}\hat{Z}\hat{R}_y(\theta_Z)\hat{V}\hat{R}_y(\theta_Z) \ldots \hat{W}\hat{R}_y(\theta_A)\hat{V}\hat{R}_y(\theta_A)\hat{U}|0\rangle \quad (12)$$

This has the $\prod_D (2G_D+1)$-parameter tomography [$(2G+1)^M$ if $G_D$ is independent of D], $$O(\theta_A, \ldots, \theta_Z) = \sum_{\vec{i}} C_{\vec{i}} \prod_{i_D \in \vec{i}} \phi_{i_D}(\theta_D) \quad (13)$$

where each digit of $\vec{i}$ ranges from $-G_D$ to $+G_D$ (inclusive. The basis functions are $\sin(G_D \cdot 2\theta), \ldots, \sin(2 \cdot 2\theta), \sin(1 \cdot 2\theta)$ 1, $\cos(1 \cdot 2\theta) \cos(2 \cdot 2\theta), \ldots, \cos(G_D \cdot 2\theta)$.

Two technical notes with the circuit above: (1) in QAOA, often the interstitial operators $\hat{U}, \hat{V}, \ldots$ are the identity, e.g., within commuting layers of 1-qubit driver terms and (2) above we have drawn the $\theta_A$ and $\theta_Z$ stages as disjoint, but they may be interleaved without changing the analysis.

For this case, a Cartesian product of $(2G_D+1)$-point Fourier grids is sufficient to resolve the tomography. The task is to redefine the grid, transfer matrix, and transfer matrix inverse. For general $G_D$, the Fourier grid is, $$\theta_p = \frac{(p+1)\pi}{2G_D+1} - \frac{\pi}{2}, p \in [0, 2G_D+1) \quad (14)$$

The transfer matrix is, $$T_{ip}^G \equiv \phi_i(\theta_p) = \begin{bmatrix} \sin(2i\theta_p) \\ 1 \\ \cos(2i\theta_p) \end{bmatrix} \quad (15)$$

As before, the M-stage transfer matrix is $\hat{T}_{(M)} \equiv \otimes_D^M \hat{T}_{(1)}^{G_D}$, and the corresponding inverse is $\hat{T}_{(M)}^{-1} \equiv \otimes_D^M \hat{T}_{(1)}^{G_D,-1}$.

5. Further Discussion of the Tomography Function

In closing this section, we make two observations regarding the Fourier quadrature resolution of the tomography parameters. The first observation is that the quadrature points may be widely spaced in $\theta$, and the tomography coefficients may be resolved by the transfer matrix inverse with coefficients that are nearly unity. This means that roughly the same statistical convergence of the observable expectation value at each quadrature grid point may be required to obtained a given absolute accuracy in the observable across the full tomography formula as is required to obtain the same accuracy in the observable at a specific point. This is in marked contrast to, e.g., finite difference derivatives, where the observable must be resolved to much higher precision at the stencil grid points to obtain a given accuracy in the approximated derivative, due to subtractive cancelation. Since we are free to analytically differentiate the tomography formula, we obtain a recipe for the analytical gradient of the observable expectation which has the same number of required observable expectation value evaluations as the second-order symmetric finite difference formula, but with markedly reduced precision requirements.

Stage 2 Description

Figure 4:
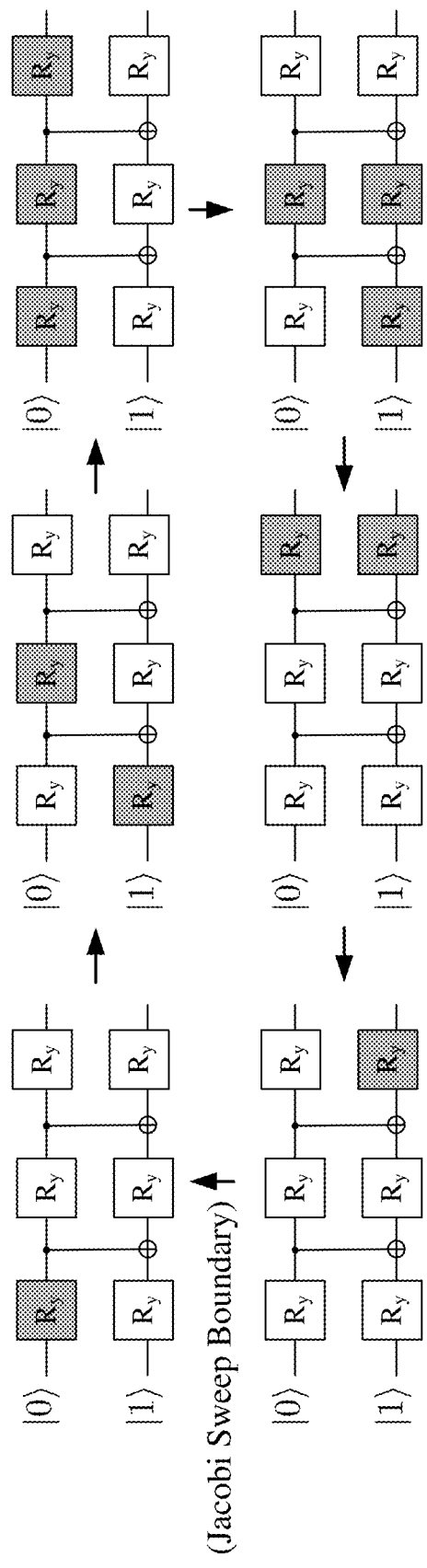
FIG. 4 illustrates a Jacobi sweep fixed-point iteration for the quantum circuit, according to an embodiment.
Figure 5A:
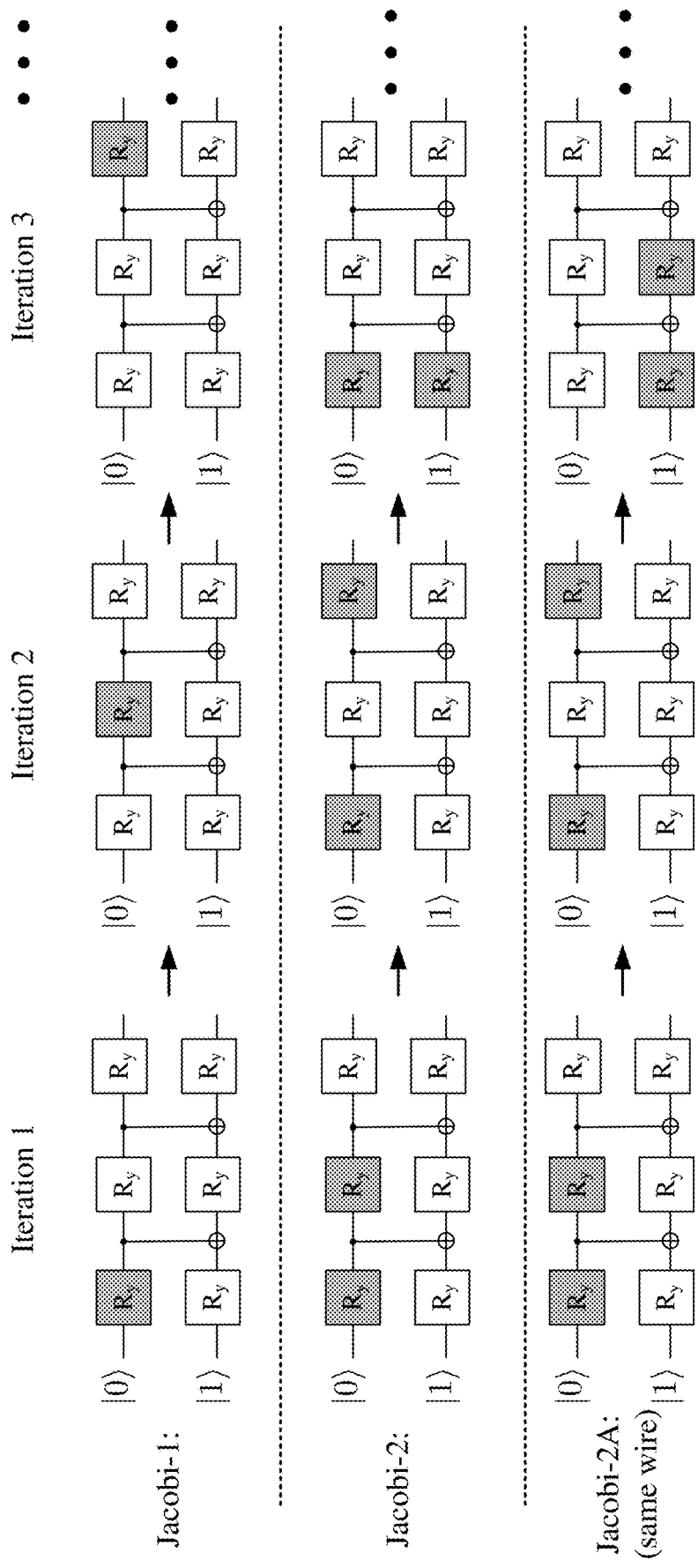
FIGS. 5A-5B illustrated additional Jacobi sweeps for the quantum circuit, according to some embodiments.
Figure 5B:
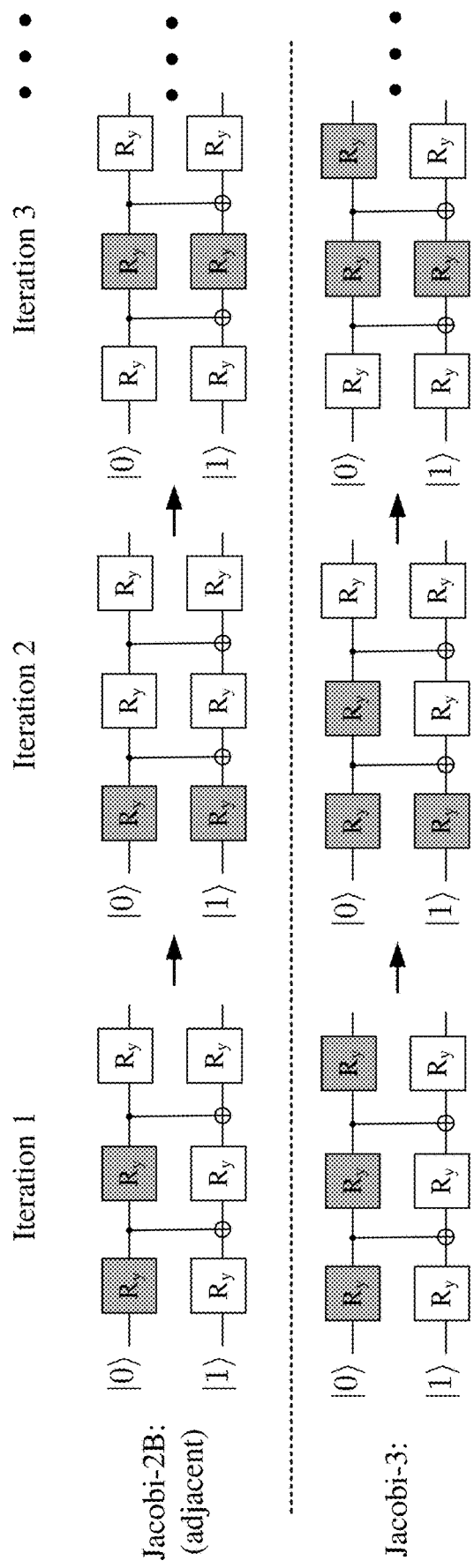

Stage 2 of the present disclosure relates to the sequential use of the cluster optimization technique described above (Stage 1) to develop a global optimization technique known as the "Jacobi sweep" fixed-point iterative procedure. For a given circuit, a Jacobi sweep may be defined as a specified sequence of active clusters. Each circuit parameter of the circuit may be specified in at least one of the clusters in the sequence. Thus, Stage 1 may be repeated for each of the clusters specified in the sweep (e.g., see Stage 2 in FIG. 1). FIGS. 4-5 illustrate example Jacobi sweeps for the quantum circuit 201, according to some embodiments. Note, that FIGS. 5A and 5B do not illustrate all of the active clusters in the sequence.

Different types of Jacobi sweeps may be performed in Stage 2. For instance, the "Jacobi-1" method (e.g., see FIG. 5A) sweeps over single parameter clusters. The "Jacobi-2" method (e.g., see FIG. 5A) sweeps over pairs of parameters. Jacobi-2 may provide faster per-sweep convergence compared to Jacobi-1 but at the cost of more clusters. For example, for circuit 201, a complete Jacobi-1 sweep includes six different iterations, while a complete Jacobi-2 sweep includes fifteen iterations (example iterations for both sweeps are illustrated in FIG. 5A). Furthermore, since two parameters are optimized in each iteration of Jacobi-2, the iterations may be more computationally expensive than the single parameter iterations of the Jacobi-1 sweep.

The "Jacobi-A" and "Jacobi-B" methods (e.g., see FIGS. 5A and 5B) are modified versions of the Jacobi-2 sweep. The Jacobi-A and Jacobi-B sweeps lie between Jacobi-1 and Jacobi-2 (in terms of computational cost) by using pairs of parameters that are restricted to a single qubit wire (Jacobi-A) or to single or adjacent qubit wires (Jacobi-B). Depending on the circuit being optimized, the global convergence rate of the Jacobi-A or Jacobi-B method may be comparable to the global convergence rate of the Jacobi-2 method.

Higher order sweeps, such as Jacobi-3 (e.g., see FIG. 5B) or higher, may also be used. However, as described when comparing Jacobi-2 with Jacobi-1, each iteration of a higher order sweep may be more computationally expensive. For example, as described above with reference to Stage 1, the number of grid points needed to determine the tomography function in a cluster iteration may increase according to $3^M$ (e.g., if G=1).

Multiple Jacobi sweeps may be performed, for example until a global convergence is reached. Thus, Stage 2 may result in a global convergence progress for quantum circuits with dozens or more parameters while making only a series of local cluster moves, where each cluster may be optimization over only a handful of circuit parameters. If multiple Jacobi sweeps are performed, a sweep may be different or the order of the clusters in the sweep may be different compared to the other sweeps. For example, a first sweep may use a Jacobi-1 method and a second subsequent sweep may use a Jacobi-2B method. In another example, a Jacobi-1 sweep is performed multiple times, and the order of the clusters may be different for each sweep. However, if Stage 3 is performed, the type of sweep and the order of the clusters may be the same for each sweep.

Example Method Steps of Stage 2

In some embodiments, Stage 2 is a Jacobi-sweep fixed-point iterative method to perform global optimization of the quantum circuit by considering active clusters of circuit parameters and sweeping iteratively over the clusters. The steps of the method may include:

A sweep is specified. As previously stated, a sweep is a sequence of clusters of circuit parameters. The sweep covers some, all, or even repeated subsets of the full set of circuit parameters.

For each cluster in the sweep, the active circuit parameters may be optimized. To do this, the analytical tomography formula for a cluster of active circuit parameters may be determined (the other circuit parameters are frozen). For example, the Fourier quadrature-based method described in Stage 1 is used to determine an analytical classical tomography function for the cluster. Afterwards, as also described in Stage 1, the parameters in the cluster may be optimized based on the tomography function. Thus, the observable expectation value may be optimized for the active parameters. Note that Stage 2 is not required to perform the steps described in Stage 1. Other methods for optimizing active circuit parameters in a cluster may be used. The frozen parameters may have predefined initial values (e.g., $\theta_i$=0), optimized values determined from a previous sweep, and/or optimized values determined from a previous iteration in the current sweep (e.g., one or more circuit parameters are updated after each iteration in a sweep).

One or more sweeps are repeated until the observable expectation value has converged to desired tolerances. For example, changes in the observable expectation value between sweeps are less than a threshold value, changes in the optimized parameters between sweeps are bellow a threshold value, or the norm of the gradient of the tomography function with respect to the optimized parameters is below a threshold value. After a sweep is completed, initial circuit parameters for a new sweep may be the optimized circuit parameters determined from the previous sweep. Thus, the observable expectation value may converge toward a global solution (e.g., minimum value).

Example Cases of Stage 2

Specific realizations of this method as might be seen in VQE are:

Jacobi-1: all M=1 single one-qubit gates are selected to define the clusters in the sweep.

Jacobi-2: all M=2 pairs of one-qubit gates are selected to define the clusters in the sweep.

Jacobi-A: all M=2 pairs of one-qubit gates within the same qubit wire are selected to define the clusters in the sweep. This may yield a method with cost and accuracy between that of Jacobi-1 and Jacobi-2.

Jacobi-B: all M=2 pairs of one-qubit gates within the same and adjacent qubit wires are selected to define the clusters in the sweep. This may yield a method with cost and accuracy between that of Jacobi-1 and Jacobi-2.

Jacobi-Gen: generic clusters of user-specified one-qubit gates, including clusters of different sizes and clusters with M>2 active circuit parameters.

Other variations include extensions of these specific realizations to G>1 groups of one-qubit gates as might be seen in QAOA. Additional variations include simple variations of the selection and ordering of clusters.

Stage 3 Description

Stage 3 of the present disclosure relates to the addition of the Anderson acceleration methodology to accelerate the convergence of the Stage 2 Jacobi sweep optimization (e.g., see Stage 3 in FIG. 1). Anderson acceleration examines the iterative history of circuit parameters and corresponding estimates of the error vectors. The relationships of the error between different history vectors are considered, and a new extrapolated proposal for the optimized circuit parameters is proposed as a linear combination of the circuit parameters in the iterative history (e.g., see FIG. 6). The Anderson acceleration process may add insignificant cost to each Jacobi sweep iteration and may improve convergence behavior.

Two variants of Stage 3 include: a case where the total displacement of the Jacobi move (e.g., the difference between of the parameters of a previous iteration and parameters of the current iteration) is used as the error vector (referred to as "Anderson") and a case where the gradient vector of the partial derivatives of the observable expectation value with respect to the circuit parameters is used as the error vector (referred to as "Pulay DIIS"). These are found to substantially improve convergence behavior, particularly when combined with the Jacobi-1 method.

Example Method of Stage 3

In some embodiments, Stage 3 is an "Anderson acceleration" extension to the Jacobi-sweep algorithm (Stage 2) that examines the iteration history of previous Jacobi sweeps and proposes an accelerated/extrapolated sequence of Jacobi sweeps. The proposed sequence of moves may be based on relationships between the "error vectors" of moves or other error proxies in the iterative history. The steps of the method may include:

At each completion of the Jacobi-sweep algorithm (Stage 2), store an entry in the iterative history by recording the current set of circuit parameters (the "state vector") and some approximation of the errors of the current circuit parameters (the "error vector"). Note that Stage 2 is not required to perform the Anderson acceleration steps described in Stage 3. Other methods for iteratively optimizing circuit parameters may be used instead.

Figure 6:
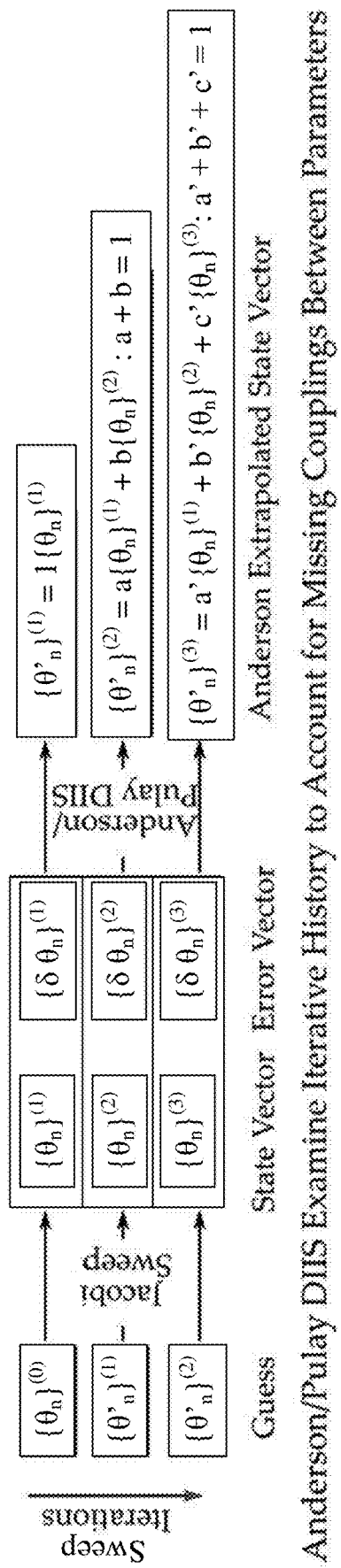
FIG. 6 is a flowchart of a method for performing an Anderson/Pulay DIIS Sequence Acceleration, according to an embodiment.

From the contents of the iterative history, construct an extrapolated estimate for a proposed set of circuit parameters that is composed of a linear combination of the iterative history of state vectors and that is predicted to have lower error (the proposed set of parameters is labeled $\{\theta'_n\}$ in FIG. 6).

Example Cases of Stage 3

The error vector is determined based on the total displacement of the circuit parameters during each Jacobi sweep. This may be referred to as "Anderson."

The error vector is determined based on the gradient vector of the partial derivatives of the observable expectation value with respect to the circuit parameters. This may be referred to as "Pulay DIIS."

The specific constituents of the state and error vectors or the mechanism of extrapolation of the Anderson acceleration procedure are not critical, and many variations of these methods exist.

Additional Explanation of Stage 3

Stage 3 may substantially accelerate the global convergence of the Jacobi-type algorithm developed (Stage 2) above, at little or no additional cost (e.g., no additional quantum measurements, and very few classical operations).

The idea of Anderson is, for a given set of non-linear equations $f(\vec{\theta})=0$ (the "vector" symbol indicates the dimension of the parameter space), one is given an iterative sequence over iteration index i of state vectors $\vec{\theta}^i$ and error vectors $\vec{\epsilon}^i \equiv \vec{\theta}^i - \vec{\theta}$ so that $\vec{\theta}^i = \vec{\theta} + \vec{\epsilon}^i$. Anderson acceleration posits that at iteration k, an improved state vector $\vec{\theta}'^{k}$ can replace $\vec{\theta}^k$, and is composed of a linear combination of the current history of iterative state vectors, $$\vec{\theta}'^{k} \equiv \sum_i c_i^k \vec{\theta}^i \quad (16)$$

The corresponding improved error vector is, $$\vec{\epsilon}'^{k} \equiv \sum_i c_i^k \vec{\epsilon}^i \quad (17)$$

Anderson acceleration proposes that the coefficients $c_i^k$ be chosen to minimize the square of the 2-norm of $\vec{\epsilon}'^{k}$.

$$O^k(c_i) = \sum_{ij} c_i^k c_j^k \vec{\epsilon}^i \cdot \vec{\epsilon}^j \quad (18)$$

subject to the normalization condition, $$\sum_i c_i^k = 1 \quad (19)$$

In the limit of a sufficiently large iterative space to span the vector space for $\vec{\theta}$, this is guaranteed to produce the desired result of $\vec{\theta}'^{k} \equiv \theta^k$, and will provide a least-squares error approximation in a less-complete limit. An analytical solution for the linearly-constrained least-squares problem is obtained, $$\begin{bmatrix} B_{11} & \cdots & B_{1k} & -1 \\ \vdots & \ddots & \vdots & \vdots \\ B_{k1} & \cdots & B_{kk} & -1 \\ -1 & \cdots & -1 & 0 \end{bmatrix} \begin{bmatrix} c_1^k \\ \vdots \\ c_k^k \\ \lambda \end{bmatrix} = \begin{bmatrix} 0 \\ \vdots \\ 0 \\ -1 \end{bmatrix} \quad (20)$$

Here $B_{ij} \equiv \vec{\epsilon}^i \cdot \vec{\epsilon}^j$ and $\gamma$ is a Langrange multiplier corresponding to the normalization constraint. The numerical cost of predicting $\theta'^{k}$ from the iterative history is minimal (and all classical): only the inner-products inner-products in $B_{ij}$, a matrix inversion of the dimension of k+1, and the vector addition to form $\theta'^k$ are required.

The cognizant reader will have noticed that the above manipulations would all be for naught if we actually had the iterative history of the error vector $\vec{\epsilon}^k$: at any iteration (including the first iteration), we could simply obtain the full solution as $\theta = \theta_k - \vec{\epsilon}_k$. In practice, Anderson acceleration replaces the iterative history of the exact error vector $\vec{\epsilon}^k$ with a proxy quantity $\widetilde{\epsilon}^k$ that is pragmatically chosen to approximate a scaled error vector. For instance, the displacement of the parameters during a fixed-point iterative move $\delta\vec{\theta}^k \equiv \vec{\theta}^k - \vec{\theta}^{k-1}$ (the original Anderson and Pulay DIIS proposals) may be effective slowly converging fixed-point series which are making large numbers of small moves in roughly the same direction. Alternatively, an approximately preconditioned gradient may prove more useful for accelerating nonlinear optimization procedures posed as gradient root finding or linear solve procedures posed as residual zero finding.

Note that the invocation of Anderson or Pulay DIIS sequence acceleration techniques may invalidate the monotonic convergence property of the Jacobi diagonalization-type procedure. However, we note that Anderson/Pulay DIIS are robust methods such that if a "bad move" is proposed, it will usually have a large associated error vector, and therefore its DIIS coefficient will be small.

1. Anderson-Style Acceleration

There are some implementation subtleties regarding the order of Jacobi and Anderson steps, the initiation of the iterative sequence, and the timing and history of the Anderson subspace. For Anderson-style acceleration, the first few iterations of the sequence may be:

$$\vec{\theta}^0 \xrightarrow{\text{Jacobi}} \vec{\theta}^1 \, DIIS\left[\vec{\theta}^1, \, \delta\vec{\theta}^1 \equiv \vec{\theta}^1 - \vec{\theta}^0\right] \quad (21)$$

$$\vec{\theta}'^{1} \xrightarrow{\text{Jacobi}} \vec{\theta}^2 \, DIIS\left[\vec{\theta}^2, \, \delta\vec{\theta}^2 \equiv \vec{\theta}^2 - \vec{\theta}'^{1}\right]$$

$$\vec{\theta}'^{2} \xrightarrow{\text{Jacobi}} \vec{\theta}^3 \, DIIS\left[\vec{\theta}^3, \, \delta\vec{\theta}^3 \equiv \vec{\theta}^3 - \vec{\theta}'^{2}\right].$$

Here $DIIS[\theta, \epsilon]$ is a subroutine call that adds state vector $\theta$ and error vector $\vec{\epsilon}$ to the iterative history, and then returns an extrapolated result for $\vec{\theta}$ from the current contends of the iterative history.

2. Pulay-Style DIIS Acceleration

Similarly, for Pulay-style DIIS the first few iterations of the sequence may be:

$$\vec{\theta}^{\prime 0}\text{DIIS}\left[\vec{\theta}^{0},\vec{G}^{(\theta^{0})}\right]\vec{\theta}^{\prime 0}\underrightarrow{\text{Jacobi}} \quad (22)$$

$$\vec{\theta}^{\prime 1}\text{DIIS}\left[\vec{\theta}^{1},\vec{G}^{(\theta^{1})}\right]\vec{\theta}^{\prime 1}\underrightarrow{\text{Jacobi}}$$

$$\vec{\theta}^{\prime 2}\text{DIIS}\left[\vec{\theta}^{2},\vec{G}^{(\theta^{2})}\right]\vec{\theta}^{\prime 2}\underrightarrow{\text{Jacobi}}$$

Here $\vec{G}(\theta)$ is the gradient vector $$\frac{\partial O}{\partial \theta_g}$$

at the current parameter set.

While the above written description enables one of ordinary skill to make and use this method, those of ordinary skill will recognize that variations of the specific embodiment are possible. The patent should therefore not be limited by the particular description above.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A non-transitory computer-readable storage medium comprising stored instructions to determine an observable expectation value of a quantum circuit comprising N groups of one or more gates, wherein the gates within each group are characterized by a parameter $\theta_n$ and the observable expectation value is a function of the parameters $\theta_n$, the instructions, when executed by one or more non-quantum processors, cause the one or more non-quantum processors to perform operations comprising:
   selecting a subset M of the N groups, the selected subset of gates characterized by parameters $\theta_m$;
   determining a grid point sampling a domain of the parameters $\theta_m$;
   sending one or more instructions to a quantum processor to configure the parameters $\theta_m$ of the quantum circuit for the grid point, and to sample the observable expectation value of the quantum circuit configured at the grid point; and
   determining a function for the observable expectation value as a function of the parameters $\theta_m$.

2. The non-transitory computer-readable storage medium of claim 1, wherein the quantum circuit comprises N groups of G gates, and wherein determining the grid point further comprises determining $(2G+1)^M$ grid points at which to sample an output of the quantum processor, consisting of an M-dimensional rectangular grid in a periodic domain of the M parameters $\theta_m$, with $(2G+1)$ evenly spaced grid points along each dimension.

3. The non-transitory computer-readable storage medium of claim 1, further comprising determining values of the parameters $\theta_m$ that optimize the function, wherein the optimized function is a minimum or a maximum of the function.

4. The non-transitory computer-readable storage medium of claim 1, wherein the function is an M-dimensional discrete Fourier series where at least one coefficient is based on the observable expectation value samples from the quantum processor at the grid point.

5. The non-transitory computer-readable storage medium of claim 4, wherein the quantum circuit comprises N groups of G gates, and wherein the Fourier series includes $(2G+1)$ Fourier basis functions in each dimension.

6. The non-transitory computer-readable storage medium of claim 4, wherein determining the function comprises determining Fourier coefficients of the Fourier series.

7. The non-transitory computer-readable storage medium of claim 1, wherein the grid point is a Fourier Quadrature grid point.

8. A non-transitory computer-readable storage medium comprising stored instructions to determine an observable expectation value of a quantum circuit comprising N groups of one or more gates, wherein the gates within each group are characterized by a parameter $\theta_n$ and the observable expectation value is a function of the parameters $\theta_n$, the instructions, when executed by one or more non-quantum processors, cause the one or more non-quantum processors to perform operations comprising:
   performing one or more sweeps through the parameters $\theta_n$, each sweep comprising a fixed number of iterations that sweep through the parameters $\theta_n$, each iteration comprising:
      selecting a subset M of the N groups, the selected subset of gates characterized by parameters $\theta_m$;
      determining a grid point sampling a domain of the parameters $\theta_m$;
      sending one or more instructions to a quantum processor to configure the parameters $\theta_m$ of the quantum circuit for the grid point, and to sample the observable expectation value of the quantum circuit configured at the grid point; and
      determining a function for the observable expectation value as a function of the parameters $\theta_m$.

9. The non-transitory computer-readable storage medium of claim 8, wherein sweeps are performed until at least one of:
   a change in an observable expectation value of the quantum circuit configured at the parameters $\theta_m$ between sweeps is below a threshold value;
   a change in the parameters $\theta_m$ between sweeps is below a threshold value; or
   a norm of a gradient of a function with respect to the parameters $\theta_m$ is below a threshold value.

10. The non-transitory computer-readable storage medium of claim 8, wherein M is the same for all iterations and each sweep iterates through the same subset of M groups in the same order.

11. The non-transitory computer-readable storage medium of claim 8, wherein the quantum circuit comprises N groups of G gates, and wherein M=2 and G=1, and each subset M for a sweep includes parameters $\theta_m$ of gates that are on a same qubit wire.

12. The non-transitory computer-readable storage medium of claim 11, wherein each subset M for the sweep further includes Om of gates on an adjacent wire.

13. The non-transitory computer-readable storage medium of claim 8, wherein the quantum circuit comprises N groups of G gates, and wherein G=1 and the operations solve a variational quantum eigensolver algorithm.

14. The non-transitory computer-readable storage medium of claim 8, wherein the quantum circuit comprises N groups of G gates, and wherein G>1 and the operations solve a quantum approximate optimization algorithm.

15. A non-transitory computer-readable storage medium comprising stored instructions to determine an observable expectation value of a quantum circuit comprising N groups of one or more gates, wherein the gates within each group are characterized by a parameter $\theta_n$, and the observable expectation value is a function of the parameters $\theta_n$, the instructions, when executed by one or more non-quantum processors, cause the one or more non-quantum processors to perform operations comprising:

performing three or more sweeps through the parameters $\theta_n$, each sweep comprising a fixed number of iterations that sweep through the parameters $\theta_n$, each iteration comprising:
  selecting a subset M of the N groups, the selected subset of gates characterized by parameters $\theta_m$;
  determining a grid point sampling a domain of the parameters $\theta_m$;
  sending one or more instructions to a quantum processor to configure the parameters $\theta_m$ of the quantum circuit for the grid point, and to sample the observable expectation value of the quantum circuit configured at the grid point; and
  determining a function for the observable expectation value as a function of the parameters $\theta_m$; and
for at least one of the sweeps, predicting a set of parameters $\theta_n$ that has an improved observable expectation value compared to the parameters $\theta_n$ resulting from the immediately previous sweep.

16. The non-transitory computer-readable storage medium of claim 15, wherein the prediction is based on error values associated with the parameters $\theta_n$ from previous sweeps, and wherein the error values are based on a gradient of a partial derivative of the sampled observable expectation values.

17. The non-transitory computer-readable storage medium of claim 15, the prediction is based on error values associated with the parameters $\theta_n$ from previous sweeps, and wherein the error values are based on a displacement of parameters $\theta_n$ during the sweeps.

18. The non-transitory computer-readable storage medium of claim 15, wherein the predicted set of parameters $\theta_n$ is determined by constructing a linear combination of the parameters $\theta_n$ from previous sweeps.

19. The non-transitory computer-readable storage medium of claim 18, the prediction is based on error values associated with the parameters $\theta_n$ from previous sweeps, and wherein coefficients of the linear combination are based on the associated error values.

20. The non-transitory computer-readable storage medium of claim 18, wherein a sum of coefficients of the linear combination equals 1.

* * * * *